United States Patent
Kato et al.

[11] Patent Number: 5,815,267
[45] Date of Patent: Sep. 29, 1998

[54] DISPLACEMENT INFORMATION MEASURING APPARATUS IN WHICH A LIGHT-RECEIVING CONDITION ON A PHOTODETECTOR IS ADJUSTABLE

[75] Inventors: Shigeki Kato, Utsunomiya; Makoto Takamiya, Tokyo, both of Japan

[73] Assignee: Canon Kabushiki Kaisha, Tokyo, Japan

[21] Appl. No.: 525,422

[22] Filed: Sep. 7, 1995

[30] Foreign Application Priority Data

Sep. 9, 1994 [JP] Japan .................................. 6-241875
Apr. 25, 1995 [JP] Japan .................................. 7-101195

[51] Int. Cl.$^6$ .................................................. G01B 9/02
[52] U.S. Cl. .......................................... 356/356; 356/28.5
[58] Field of Search .................................. 356/356, 349, 356/28.5

[56] References Cited

U.S. PATENT DOCUMENTS 3,856,401 12/1974 Heitmann et al. ..................... 356/28
5,101,112 3/1992 Amari ..................................... 250/561
5,327,222 7/1994 Takamiya et al. ...................... 356/356

FOREIGN PATENT DOCUMENTS 0458276 11/1991 European Pat. Off. .
0522815 1/1993 European Pat. Off. .

*Primary Examiner*—Samuel A. Turner
*Attorney, Agent, or Firm*—Fitzpatrick, Cella, Harper & Scinto

[57] ABSTRACT

An apparatus for measuring displacement information of a target object includes an illumination system, a photodetector, and an adjusting member. The illumination system causes a beam from a light source to be incident on the target object. The photodetector receives and detects light from the target object upon incidence of the beam from the illumination system on the target object. The displacement information of the target object is measured upon detection of the light by the photodetector. The adjusting member changes a light-receiving state of the light on the photodetector.

17 Claims, 15 Drawing Sheets f=826.98901Hz

5,815,267

DISPLACEMENT INFORMATION MEASURING APPARATUS IN WHICH A LIGHT-RECEIVING CONDITION ON A PHOTODETECTOR IS ADJUSTABLE

BACKGROUND OF THE INVENTION

1. Field of the Invention

The present invention relates to a displacement information measuring apparatus and, more particularly, to a displacement information measuring apparatus suitable for a velocimeter utilizing a Doppler effect and capable of measuring a moving velocity of a moving object or fluid (to be referred to as a moving object hereinafter) and displacement information associated with a displacement of the moving object in a non-contact manner by irradiating a laser beam on the moving object and detecting a shift in frequency of scattered light Doppler-shifted in accordance with the moving velocity of the moving object.

2. Related Background Art

A laser Doppler velocimeter has been used as a conventional apparatus for measuring a moving velocity of a moving object with high precision in a non-contact manner. The laser Doppler velocimeter is an apparatus for measuring the moving velocity of the moving object by irradiating a laser beam on the moving object and utilizing an effect (Doppler effect) of shifting the frequency of scattered light from the moving object in proportion to the moving velocity.

FIG. 1 is a view for explaining the main part of a conventional laser Doppler velocimeter.

Referring to FIG. 1, a laser beam emitted from a laser 1 is collimated into a parallel beam 3 by a collimator lens 2. The parallel beam 3 is split into two beams 5a and 5b by a beam splitter 4. These two beams are reflected by mirrors 6a and are 6b and incident, at an incident angle θ, on a moving object (target object) 7 moving at a velocity V. Light beams doppler-shifted and scattered by the moving object 7 are detected on a photodetector 12 through a condenser lens 18. The moving velocity V of the moving object 7 is obtained by a known method using a signal from the photodetector 12.

In this case, the frequencies of the scattered light beams upon incidence of the two beams are Doppler-shifted by frequencies +f and −f in proportion to the moving velocity V. When the wavelength of the laser beam is defined as λ, a frequency f is represented by equation (1) below:

$$f = V \cdot \sin \theta / \lambda \tag{1}$$

The scattered light beams Doppler-shifted by the frequencies +f and −f interfere with each other to vary brightness portions on the light-receiving surface of the photodetector 12, and its frequency F is given by equation (2) below:

$$F = 2V \cdot \sin \theta / \lambda \tag{2}$$

When the frequency F (to be referred to as a Doppler frequency hereinafter) of an output signal from the photodetector 12 is measured, the velocity of the moving object 7 can be obtained on the basis of equation (3) below:

$$V = F \cdot \lambda / (2 \cdot \sin \theta) \tag{3}$$

FIG. 2 is a schematic view for explaining a conventional signal processor.

A signal from the photodetector 12 is input to a bandpass filter (BPF) 16. The BPF 16 improves the S/N ratio of the signal and supplies the resultant signal to a phase-locked loop (PLL) 17. The PLL 17 converts the input signal into a continuous signal which is then input to an arithmetic means 19. The arithmetic means 19 detects the Doppler frequency F using the input signal and obtains the moving velocity V of the moving object 7 on the basis of equation (3).

FIG. 3 is a schematic view showing the main part of another conventional Doppler velocimeter. Cylindrical lenses 15a and 15b are inserted in optical paths in place of the condenser lens 18 of the Doppler velocimeter in FIG. 1 to set the irradiation shape of the laser beam onto the target object 7 in a linear shape. The beam is focused in a direction perpendicular to the moving direction (arrow 7b) of the moving object 7 within the irradiation plane on the surface of the moving object 7, as shown in FIG. 4, thereby increasing the S/N ratio of the Doppler signal.

With this arrangement, an irradiation width d of a laser beam 7a on the moving object 7 can be reduced to an almost beam waist as the minimum value. At this time, individual speckles formed on the photodetector 12 form a horizontal line, as shown in FIG. 4. A horizontal width D of speckles 12a formed on the photodetector 12 is defined as follows:

$$D = \lambda \cdot L_0 / d \tag{4}$$

where $L_0$ is the distance from the moving object 7 to the photodetector 12. When the irradiation width d of the laser beam 7a is reduced in accordance with equation (4), the horizontal width D of the speckles increases, and the speckles appearing on the photodetector 12 are reduced. For this reason, the averaging effect of the AC components of a total light amount is reduced to increase the S/N ratio of the Doppler signal.

A detection signal proportional to the velocity of a moving object, which is detected by the photodetector, generally has a low level due to reception of scattered light on the surface of the moving object and a low S/N ratio due to superposition of noise. In addition, the signal level varies depending on the surface state of the moving object, so "drop out", i.e., an omission in the Doppler signal tends to occur.

FIG. 5 is a perspective view showing the main part of a speckle pattern observation apparatus. Two beams are irradiated on the moving object to form a beam spot 10. This beam spot 10 represents an irradiated area. FIG. 6 shows a speckle pattern formed in the irradiated area 10 upon reception of a signal by a CCD camera 11. When the moving object 7 moves in a direction indicated by an arrow 7b in FIG. 5, the brightness intensity of the speckle pattern in FIG. 6 is modulated using the moving distance λ/(2·sin θ) as a period. Drop out is defined as a phenomenon in which changes in brightness of the speckle pattern are made to cancel each other to reduce a beat signal amplitude of a total light intensity.

When drop out occurs for a long period of time, measurement precision is generally degraded due to a difference between a signal output from the PLL 17 and a signal to be output upon actual movement of the moving object. Even if the cylindrical lenses are arranged in optical paths, as shown in Fig. 3, to reduce the spot diameter of the irradiated light beams so as to increase the horizontal width of the speckles, thereby increasing the S/N ratio, the drop out cannot be theoretically eliminated. A drop out time is prolonged at a lower velocity in measurement of a single object, and the measurement precision is degraded. In addition, when the velocity of the moving object 7 becomes zero, the surface state of the target object does not change, and measurement may become impossible due to the drop out.

SUMMARY OF THE INVENTION

It is an object of the present invention to provide a displacement information measuring apparatus utilizing a Doppler effect, wherein an adjusting means for adjusting a light-receiving area on the surface of a moving object, a light-receiving direction of scattered light from the moving object, or a light-receiving state such as a light-receiving amount is used to prevent drop out in detection of the scattered light from the moving object, so that a signal can be obtained even at zero velocity of the moving object, thereby measuring displacement information of the moving object with always stable precision.

The above and other objects, features, and advantages of the present invention will be apparent from the following detailed description of preferred embodiments in conjunction with the accompanying drawings.

DESCRIPTION OF THE PREFERRED EMBODIMENTS

Figure 7:
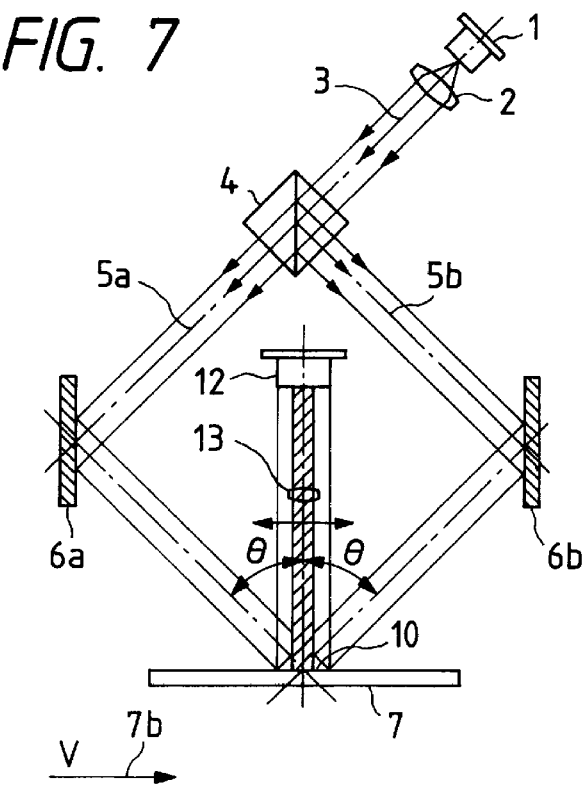
FIG. 7 is a schematic view showing the main part of the first embodiment of the present invention.

FIG. 7 is a schematic view showing the main part of an optical system according to the first embodiment of the present invention.

Referring to FIG. 7, a laser beam emitted from a laser (light source means) 1 is collimated into a parallel beam 3 by a collimator lens 2 and split into a transmitted beam 5a and a reflected beam 5b by a beam splitter 4. The transmitted and reflected beams 5a and 5b are reflected by reflecting mirrors 6a and 6b, respectively. These reflected beams are incident, at an incident angle θ from different directions, on an area 10 of a moving object moving at a velocity V in a direction indicated by an arrow 7b. Scattered beams Doppler-shifted in proportion to the moving velocity V from the area 10 of the moving object 7 are detected by a photodetector 12.

At this time, a Doppler frequency F detected by the photodetector 12 is defined as described in the Description of the Related Art, but will be explained again. The frequencies of the scattered beams derived from the two incident beams have been Doppler-shifted by frequencies +f and −f in proportion to the moving velocity V. The frequency f is defined by equation (1) below:

$$f = V \cdot \sine\theta/\lambda \qquad (1)$$

where λ is the wavelength of the laser beam.

The scattered beams Doppler-shifted by the frequencies +f and −f interfere with each other to form bright and dark portions on the light-receiving surface of the photodetector 12, and its frequency F is given by equation (2) below:

$$F = 2V \cdot \sin\theta/\lambda \qquad (2)$$

When the frequency F (to be referred to as a Doppler frequency hereinafter) of an output signal from the photodetector 12 is measured, the velocity V of the moving object 7 can be obtained on the basis of equation (3) below:

$$V = F \cdot \lambda/(2 \cdot \sin\theta) \qquad (3)$$

An adjusting means 13 changes the light-receiving area of the beams scattered from the moving object 7 and detected by the photodetector 12. In this embodiment, the adjusting means 13 comprises a partial light-shielding member 13 which is arranged in the optical path in front of the photodetector 12. The partial light-shielding member 13 is moved by a piezoelectric vibration element (not shown) in a direction perpendicular to the optical path.

When the partial light-shielding member 13 is vibrated in the optical path to change the light-receiving area of the beams scattered from the moving object 7 and detected by the photodetector 12, the brightness states of the individual speckle patterns formed on the photodetector 12 irregularly change. Even if changes in brightness the speckles cancel each other to reduce the beat signal amplitude of the total light intensity, thereby causing drop out in the absence of such variations in the light-receiving area, the total brightness state of the speckle patterns on the photodetector 12 is changed to prevent the drop out state. In particular, even if the moving object is moving at a low velocity for a long period of time, the drop out can be effectively prevented.

Figure 8:
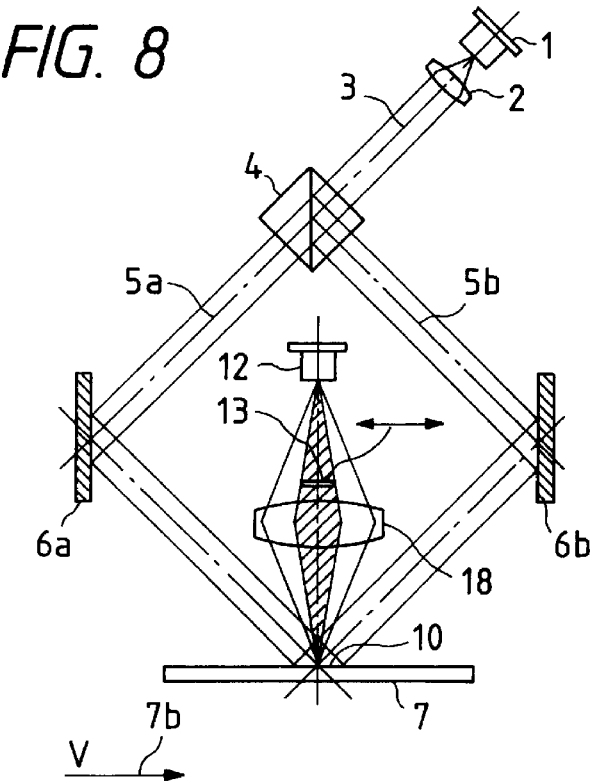
FIG. 8 is a schematic view showing the main part of the second embodiment of the present invention.

FIG. 8 is a schematic view showing the main part of the second embodiment of the present invention.

This embodiment is different from the first embodiment of FIG. 7 in that a condenser lens 18 is arranged between a moving object 7 and a partial light-shielding member 13 to detect scattered beams from an irradiated area 10 of the moving object 7. The remaining arrangement of the second embodiment is the same as that of the first embodiment.

In the second embodiment, the irradiated area 10 is set conjugate to the detection surface of a photodetector 12 by the condenser lens 18. The scattered beams from the irradiated area 10 are guided to the photodetector 12, thereby improving condensing efficiency.

In this embodiment, the partial light-shielding member 13 is vibrated in the optical path to change the light-receiving direction of the laser beam from each point in the irradiated area 10 on the surface of the moving object. Even if drop out may occur, the brightness states of the speckle patterns on the photodetector 12 are changed, thereby preventing occurrence of the drop out state. In particular, even if the moving object is moving at a low velocity for a long period of time, the drop out can be effectively prevented.

FIGS. 9 to 14 are views for explaining adjusting means arranged in optical paths extending from moving objects 7 to photodetectors 12 according to the third to eighth embodiments of the present invention, respectively.

Figure 9:
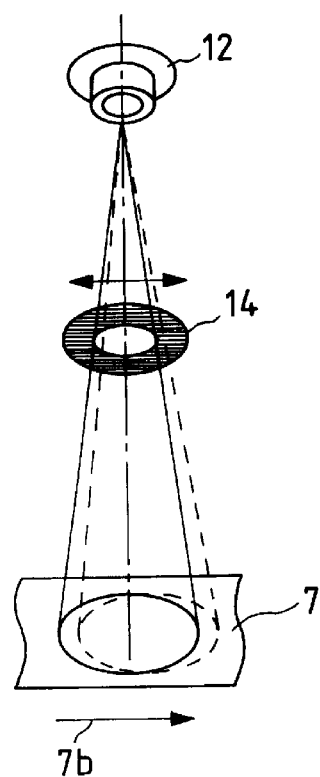
FIG. 9 is a schematic view showing the main part of a portion of the third embodiment of the present invention.

A circular aperture stop (stop member) 14 is used as the adjusting means to cause the photodetector 12 to detect scattered beams from the moving object 7 in the third embodiment of FIG. 9. The stop 14 is vibrated within the aperture plane parallel to a moving direction 7b of the moving object 7 to change the light-receiving area, thereby preventing drop out.

Figure 1:
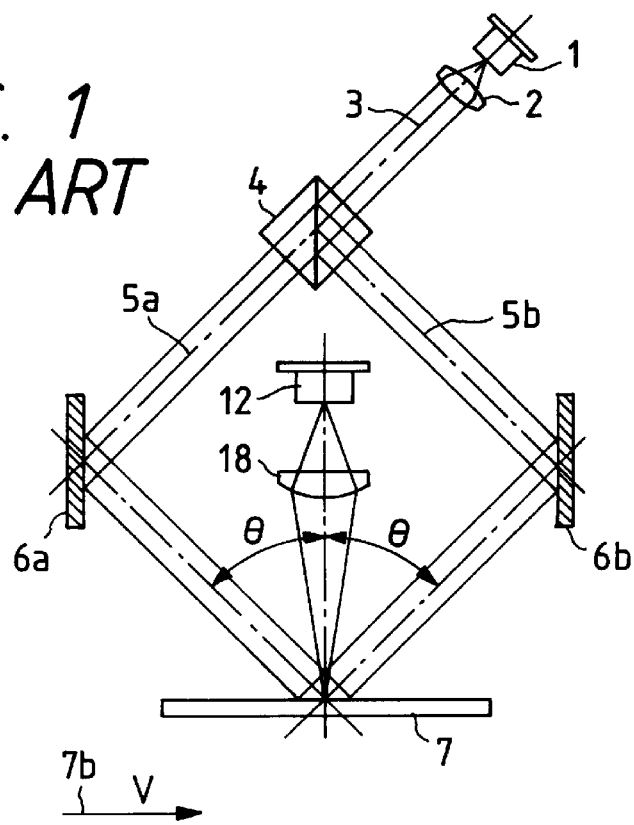
FIG. 1 is a schematic view showing the main part of a conventional laser Doppler velocimeter.
Figure 2:
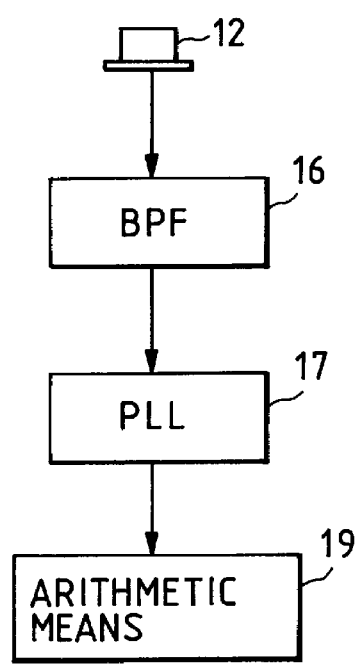
FIG. 2 is a schematic view of a signal processor in the conventional laser Doppler velocimeter.
Figure 3:
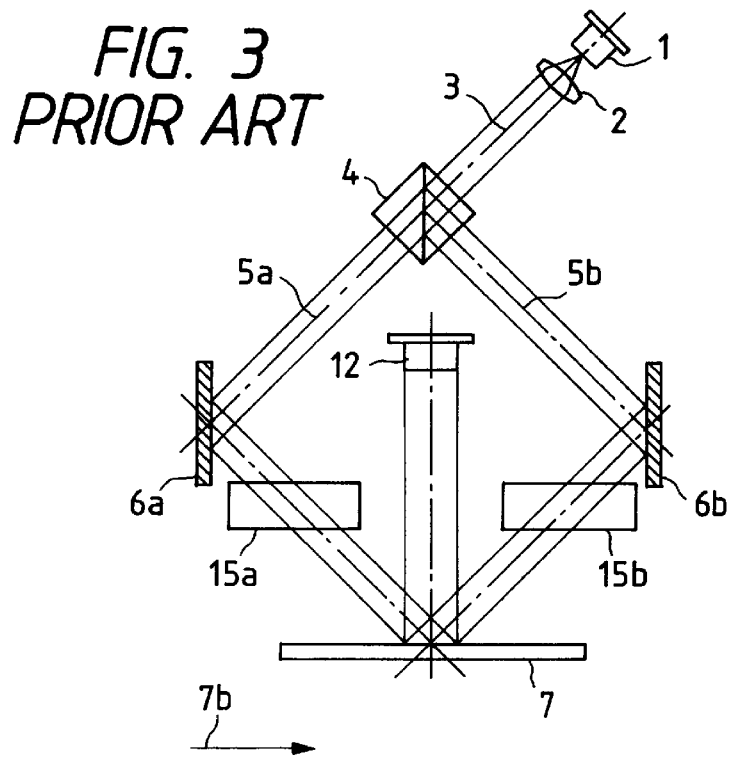
FIG. 3 is a schematic view showing the main part of another conventional laser Doppler velocimeter.
Figure 4:
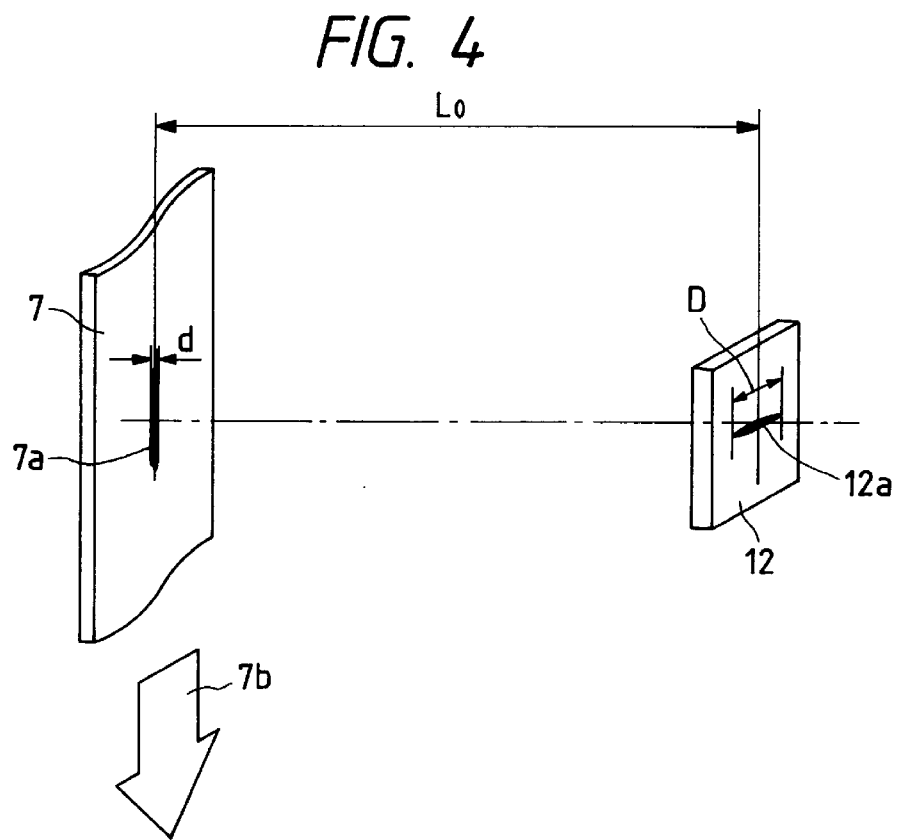
FIG. 4 is a view for explaining a speckle pattern obtained when a laser beam is linearly irradiated on a moving object.
Figure 5:
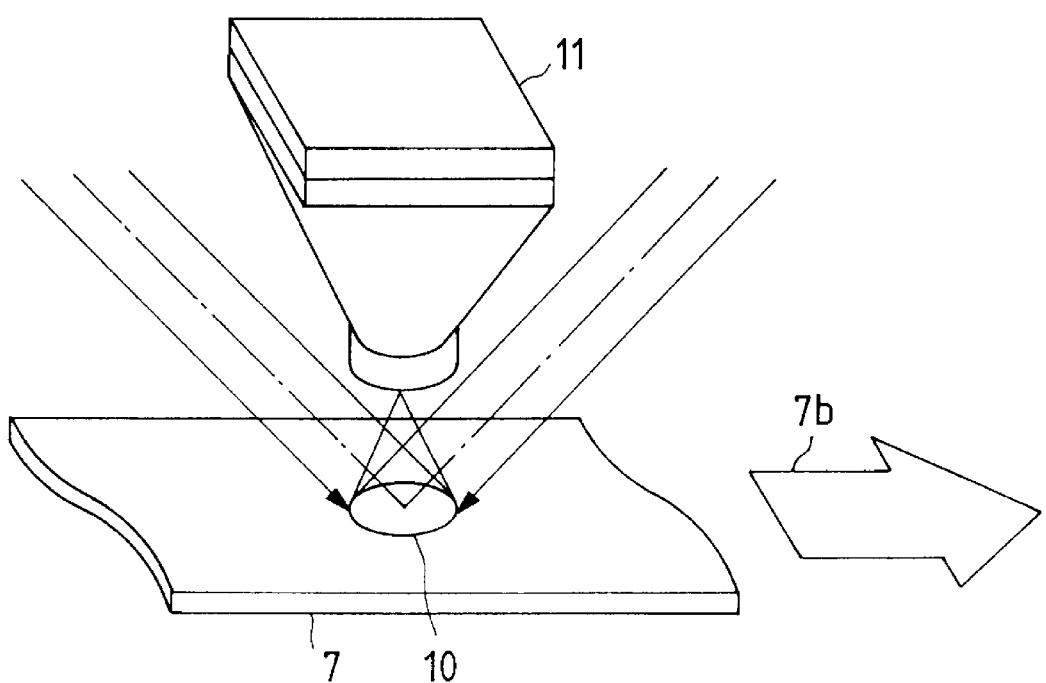
FIG. 5 is a view showing the arrangement of a speckle pattern observation apparatus.
Figure 6:
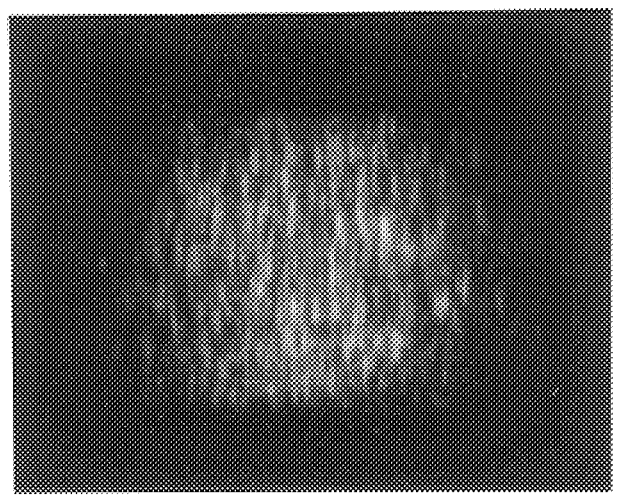
FIG. 6 is a view for explaining the speckle pattern.
Figure 10:
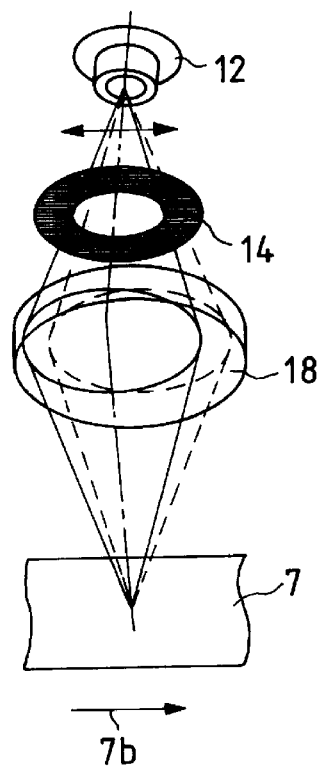
FIG. 10 is a schematic view showing the main part of a portion of the fourth embodiment of the present invention.

In the fourth embodiment of FIG. 10, a condenser lens 18 for improving condensing efficiency is added between the moving object 7 and a stop 14 in the arrangement of the third embodiment of FIG. 3. In this case, the stop (stop member) 14 is vibrated within the stop plane to change the light-receiving direction from each point within an irradiated area 10. Even if drop out may occur, the brightness states of the speckle patterns are changed on the photodetector 12, thereby preventing the drop out state. In particular, even if the moving object is moving at a low velocity for a long period of time, drop out can be effectively prevented.

Figure 11:
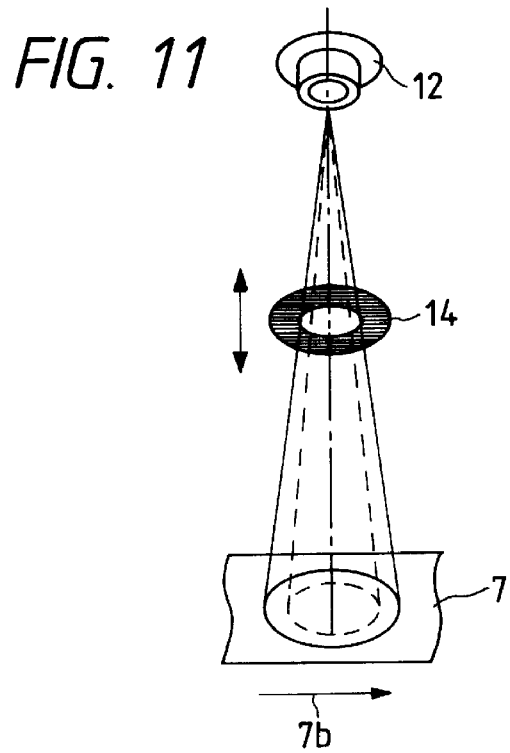
FIG. 11 is a schematic view showing the main part of a portion of the fifth embodiment of the present invention.

A circular aperture stop (stop member) 14 is used to cause the photodetector 12 to detect scattered beams from the moving object 7 in the fifth embodiment of FIG. 11. In this case, the stop 14 is vibrated in a direction perpendicular to the stop plane, i.e., in a direction perpendicular to a moving direction 7b of the moving object 7 to change the light-receiving area, thereby preventing drop out.

Figure 12:
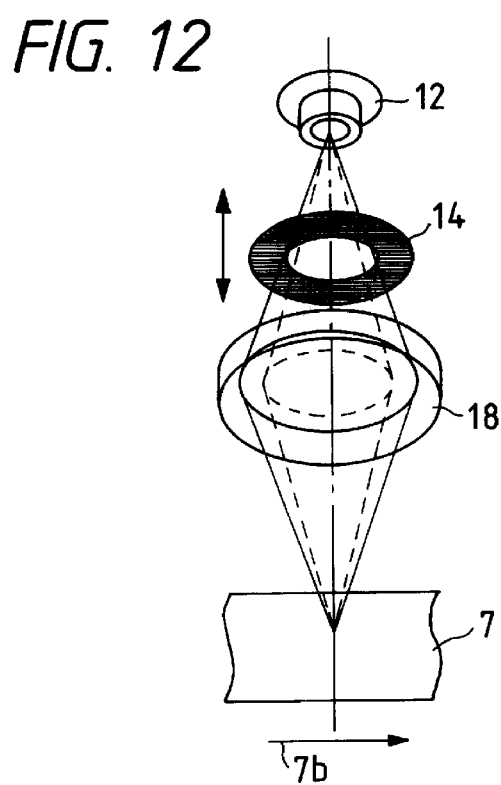
FIG. 12 is a schematic view showing the main part of a portion of the sixth embodiment of the present invention.

In the sixth embodiment of FIG. 12, a condenser lens 18 for improving condensing efficiency is added between the moving object 7 and a stop 14 in the arrangement of the fifth embodiment of FIG. 11. In this case, the stop (stop member) 14 is vibrated in a direction perpendicular to the stop plane of the stop (stop means) 14 to change the NA (Numerical Aperture) in receiving the scattered beams from the same portion on the target object 7 so as not to receive peripheral light components of the scattered beam, i.e., so as to change the light-receiving amount of the scattered beam. The balance of brightness of the speckle patterns on the photodetector 12 during occurrence of the drop out is destroyed to prevent the drop out.

Figure 13:
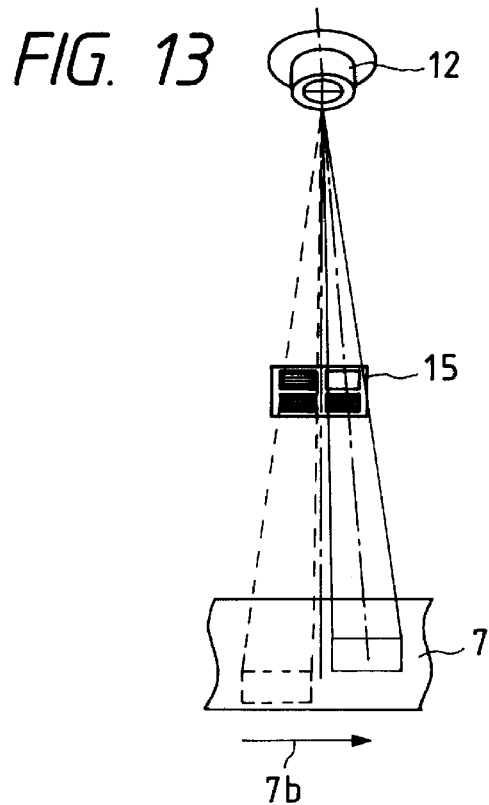
FIG. 13 is a schematic view showing the main part of a portion of the seventh embodiment of the present invention.

In the seventh embodiment of FIG. 13, a shutter member 15 using a liquid crystal is used to cause the photodetector 12 to detect the scattered beams from the moving object 7. The shutter member 15 has a plurality of openings each having a liquid crystal shutter. In this embodiment, some of the plurality of liquid crystal shutters are sequentially opened/closed by a control means to change the light-receiving area on the moving object 7, thereby preventing drop out.

Figure 14:
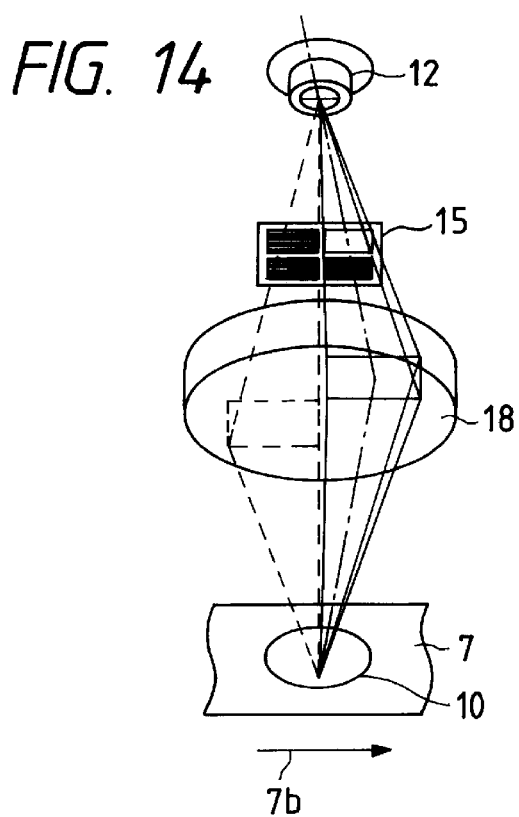
FIG. 14 is a schematic view showing the main part of a portion of the eighth embodiment of the present invention.

In the eighth embodiment of FIG. 14, a condenser lens 18 for improving condensing efficiency is added between the moving object 7 and a shutter member 15 in the arrangement of the seventh embodiment in FIG. 13. In this arrangement, liquid crystal shutters constituting the shutter member 15 are sequentially opened/closed to change the light-receiving direction from each point within an irradiated area 10, thereby preventing drop out.

Figure 15:
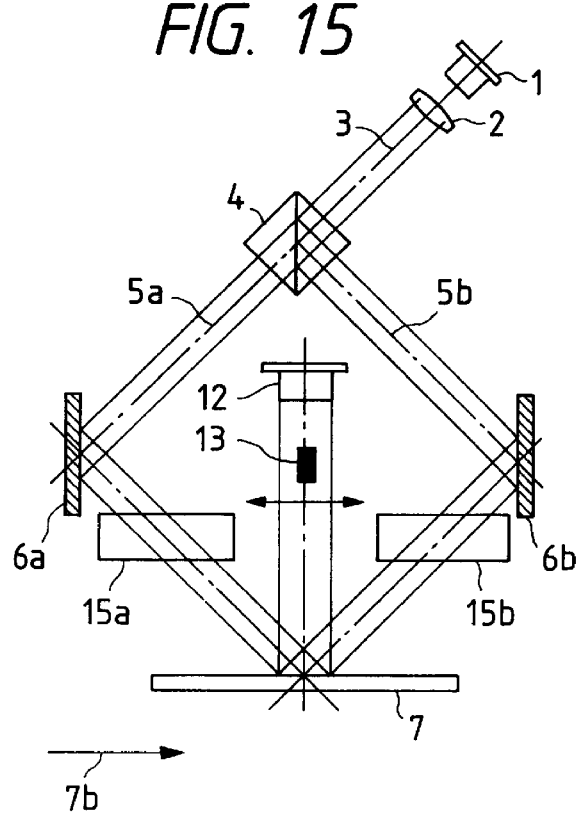
FIG. 15 is a schematic view showing the main part of the ninth embodiment of the present invention.
Figure 16:
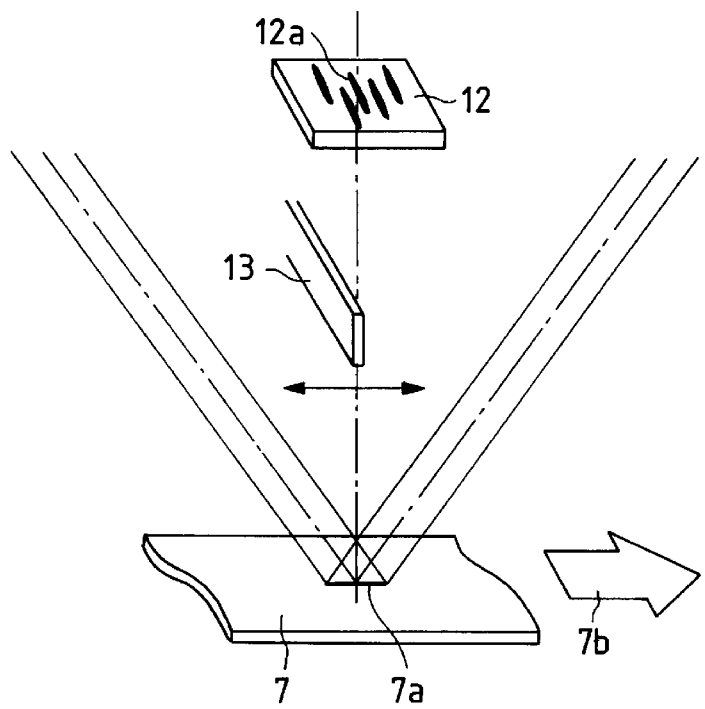
FIG. 16 is a perspective view showing the main part of a portion of FIG. 9.

FIG. 15 is a schematic view showing the main part of an optical system according to the ninth embodiment of the present invention. FIG. 16 is a perspective view showing the main part of a portion of the ninth embodiment in FIG. 15. This embodiment is different from that in FIG. 7 in that an irradiation shape of a laser beam on a moving object 7 is made linear. Cylindrical lenses 15a and 15b are arranged in optical paths between the moving object and reflecting mirrors 6a and 6b, respectively. Beams focused in a direction perpendicular to a moving direction 7b of the moving object 7 are focused into a line 7a extending on the moving object 7 in the object moving direction. As can be seen from equation (4), an elongated speckle 12a is formed on a photodetector 12 in a direction perpendicular to the moving direction 7b of the moving object 7.

In this case, when a partial light-shielding member 13 coupled to a piezoelectric vibration element is vibrated in the moving direction 7b, the averaging effect of detection signals from the photodetector 12 can be prevented with a small vibration amplitude, thereby effectively preventing drop out.

With the arrangement of each embodiment described above, by using an adjusting means for adjusting a light-receiving area on the moving object surface, a light-receiving direction of a scattered beam, or a light-receiving state such as a light-receiving amount, drop out can be prevented. Even if the velocity of the moving object is zero, a signal can be obtained, thereby obtaining a velocimeter utilizing a Doppler effect and capable of measuring displacement information of the moving object with always stable precision in accordance with the resultant signal.

Figure 17A:
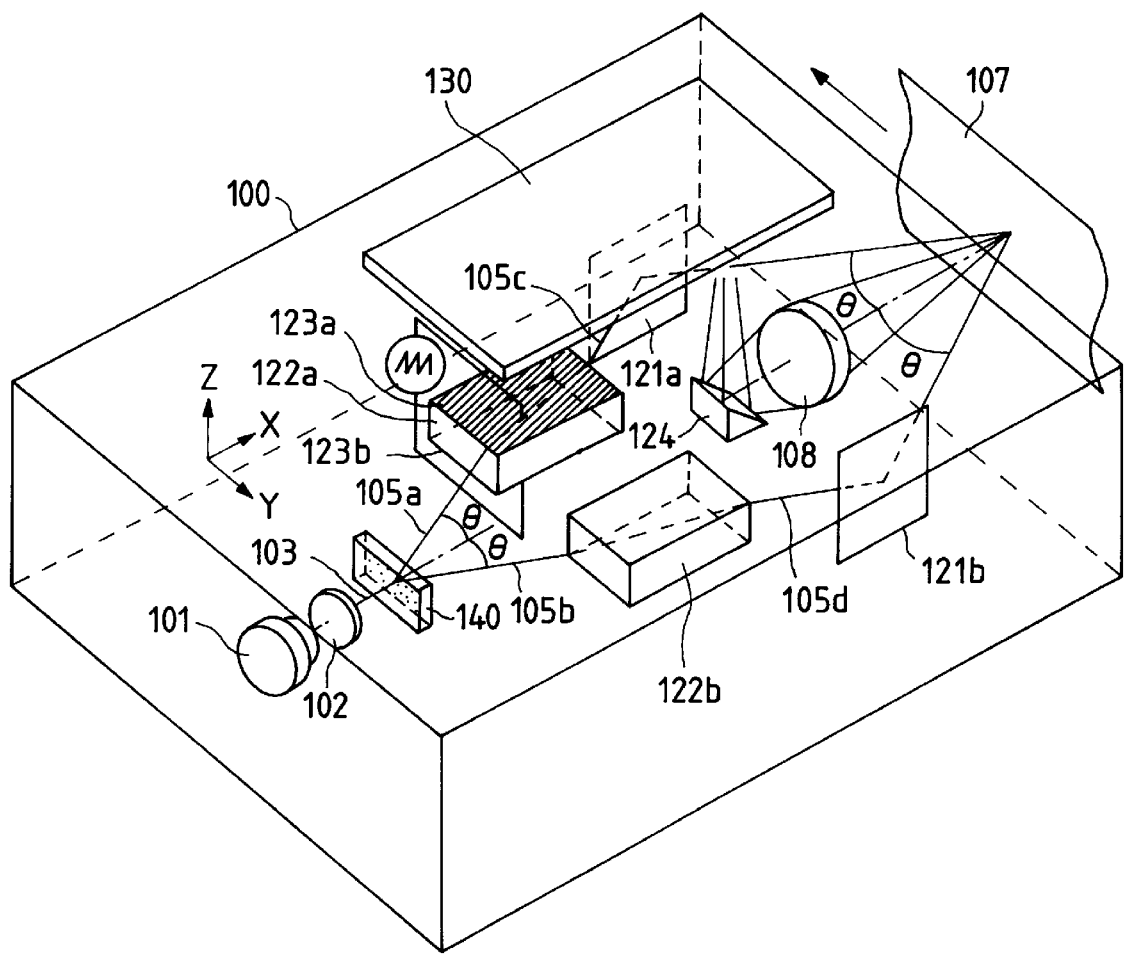
FIG. 17A is a schematic view of a laser Doppler velocimeter according to the 10th embodiment of the present invention.

FIG. 17A is a schematic view showing the main part of a laser Doppler velocimeter according to the 10th embodiment of the present invention.

A laser beam is emitted from a laser diode 101 to be linearly polarized with respect to the Z-axis in a housing 100 and collimated into a parallel beam 103 by a collimator lens 102. The parallel beam 103 is divided into two beams 105a and 105b at a diffraction angle θ by a diffraction grating 140 having a grating arrangement direction as the Y-axis and a grating pitch d.

In this case, the diffraction angle θ is defined as follows:

$$d \sin \theta = \lambda \qquad (5)$$

where λ is the wavelength of the laser beam. The two beams 105a and 105b are respectively incident on electro-optical crystal members 122a and 122b each having the c-axis (optical axis) along the Z-axis. A voltage is applied to the electro-optical crystal member 122a through electrodes 123a and 123b to apply an electric field to only the beam 105a. Let a thickness de of each electro-optical crystal member 122a or 122b be 1 mm, let its length l be 20 mm, let a laser wavelength λ be 780 nm, and let a grating pitch d be 1.6 μm. Under these conditions, a substantial length l' at which the beams 105a and 105b pass through the electro-optical crystal members 122a and 122b is defined as follows:

$$l'=l/\cos(\theta') \quad (6)$$

where θ' is the angle of a beam in an electro-optical crystal member and is defined as follows:

$$\sin(\theta)=Ne\cdot\sin(\theta') \quad (7)$$

where Ne is the refractive index of an electro-optical crystal element for extraordinary light.

Since θ≅29.18° from equation (5), l'=20.54 mm is obtained. If the refractive index Ne for extraordinary light is given as 2.2, and the Pockels constant γ is given as 32.2×10⁻⁹ (mm/V), then the voltage amplitude is given as V≅224 V, and the phase difference between the two beams is given as 2π. When serrodyne driving is performed at a frequency fR, two beams 105c and 105d having a frequency difference fR can be obtained. The beams 105c and 105d are deflected by mirrors 121a and 121b and incident at an incident angle θ on a target object 107 moving at a velocity V. Beams scattered from the object return along the optical axis of the focusing optical system through a condenser lens 108 and a reflecting prism 124. These beams are detected on a photodetector 109 (not shown in FIG. 17A) integrally formed with a circuit board 130.

As described above, the circuit board 130 having the photodetector 109 and a vibrator 126 (to be described later) is arranged at a position where the beams reflected by the reflecting prism 124 are received. The photodetector 109 and the vibrator 126 can be arranged outside the plane constituted by the optical paths of the two beams 105c and 105d, thereby reducing the size of the optical system portion.

A Doppler frequency of each detected scattered beam is defined by the frequency difference fR between the two beams as in equation (3):

$$F=2V\sin(\theta)/\lambda+fR \quad (8)$$

Equation (8) can be rewritten from equation (5) as follows:

$$F=2V/d+fR \quad (9)$$

so that a signal free from the wavelength dependency of the laser can be detected. That is, when the wavelength changes, the diffraction angle changes in accordance with equation (5). For this reason, the frequency changes by the change in wavelength of the Doppler signal can be canceled, thereby eliminating the wavelength dependency. Although the angles of beams incident on the electro-optical crystal members 122a and 122b also change, the polarization directions are maintained upon transmission through the electro-optical crystal members 122a and 122b because the polarization directions coincide with the c-axes of the electro-optical crystal members 122a and 122b. Although the substantial length l' changes to change the voltage amplitude in accordance with equation (6), a change amount can be almost neglected. Therefore, a high-precision signal can be detected even if the wavelength changes.

Detection signals from the photodetector 109, which has received the scattered beams from the object in the manner described above, are processed into a continuous signal by an electrical processor (FIG. 17B) including a band-pass filter (BPF), a phase-locked loop (PLL), and a drop out detector. A velocity measurement can be performed by an arithmetic unit in accordance with equation (9) using the frequency F derived from this continuous signal. This will be described in detail below.

Figure 17B:
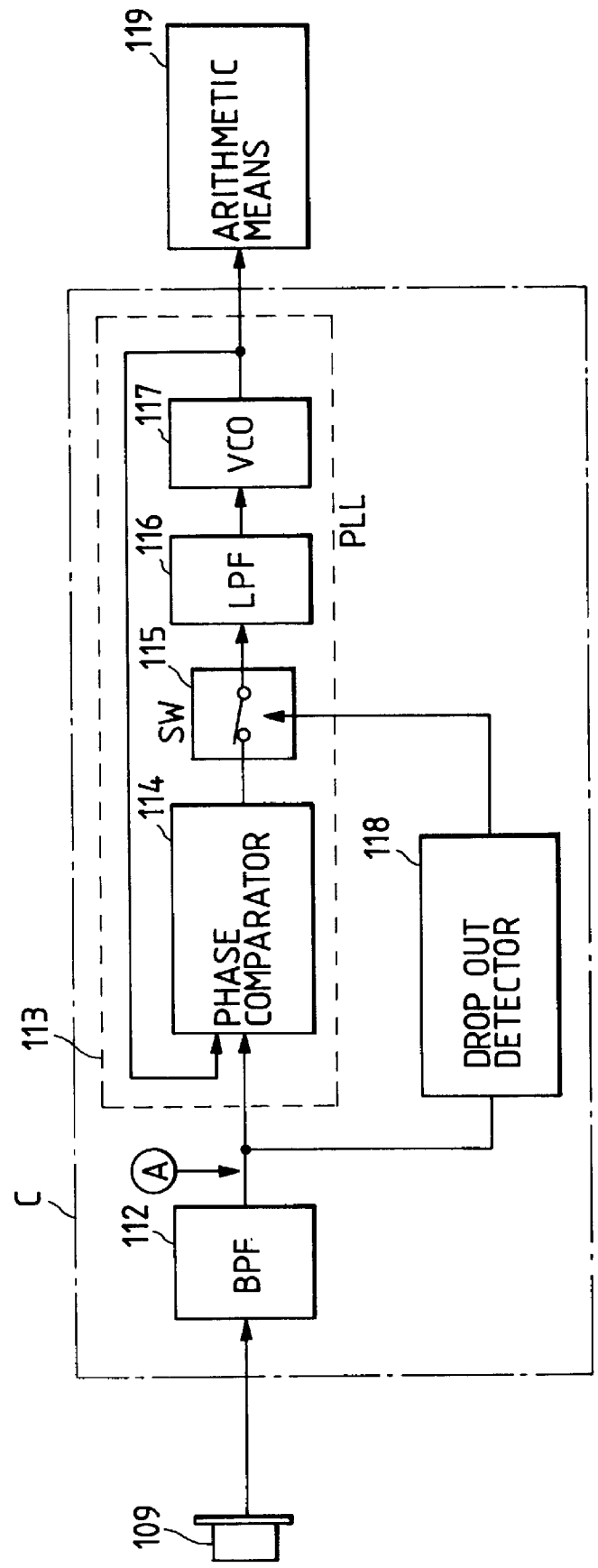
FIG. 17B is a block diagram for explaining the signal processing system of the laser Doppler velocimeter.

FIG. 17B is a schematic block diagram of an electrical processor C for processing signals from the photodetector 109.

The S/N ratio of signals from the photodetector 109 is increased by a band-pass filter (BPF) 112, and an output from the BPF 112 is output from a phase-locked loop (PLL) 113 as a continuous signal.

Figure 17C:
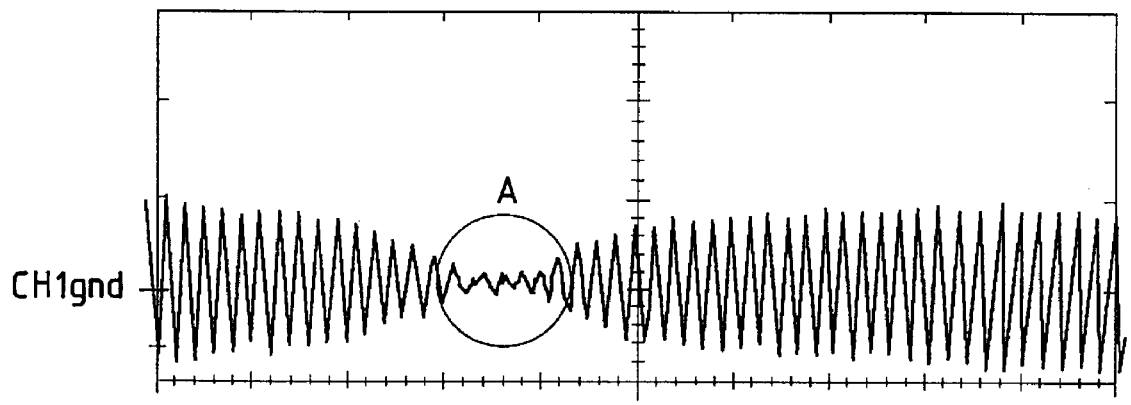
FIG. 17C is a view for explaining the drop out of a Doppler signal.

An operation performed upon occurrence of drop out, as shown in FIG. 17C, will be described below. FIG. 17C shows a signal from the BPF 112 when drop out (A portion) has occurred. A drop out detector 118 always checks an A portion signal. When the Doppler signal level becomes a predetermined value or less, as shown in FIG. 17C, the drop out detector 118 detects that drop out has occurred. A switch (SW) 115 is turned off to separate an output from a phase comparator 114 from an input to a voltage-controlled oscillator (VCO) 117. A low-pass filter (LPF) 116 holds the voltage obtained immediately before the turn-OFF operation of the SW 115, and the VCO 117 outputs a predetermined value. No disturbance caused by the drop out of the Doppler signal occurs in the PPL 113, and the PPL 113 holds the frequency output obtained immediately before the drop out. When the Doppler signal level becomes the predetermined value or more, the drop out detector 118 turns on the SW 115 to perform a normal PLL operation.

The Doppler frequency F obtained as the continuous signal in the above operation is used to cause an arithmetic means 119 to calculate the moving velocity of the moving object 107 on the basis of equation (9), thereby measuring the moving velocity V.

In the optical system arrangement of the apparatus, since the electro-optical crystal member 122a and 122b are arranged in the two optical paths, the electro-optical crystal members 122a and 122b can be introduced without changing the optical positional relationship such as the optical path lengths of the two beams.

Figure 18A:
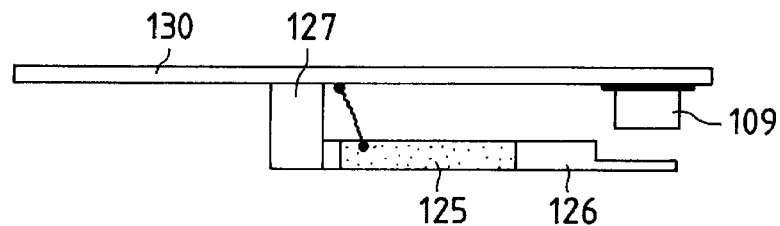
FIGS. 18A and 18B are views showing the arrangement of a circuit board of the 10th embodiment.
Figure 18B:
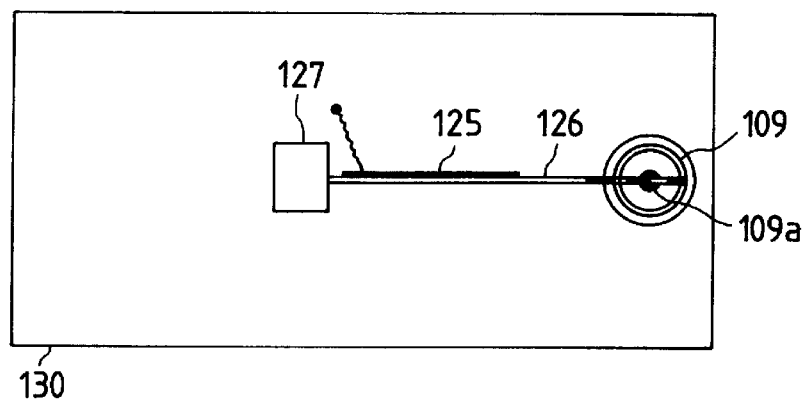

FIGS. 18A and 18B are views showing an arrangement of the photodetector 109 and the vibrator 126 which are integrally formed on the circuit board 130 in FIG. 17A. FIG. 18A is a view of the circuit board 130 when viewed from the side surface in FIG. 17A, and FIG. 18B is a view of the circuit board 130 when viewed from the bottom of FIG. 17A. The vibrator 126 is attached to a piezoelectric ceramic member 125 and fixed by a cantilevered vibrator fixing member 127. A resonance frequency fs (Hz) of the vibrator 126 is calculated by the following equation:

$$fs = (1.875^2/2\pi l^2)\sqrt{(EI/\rho A)} \quad (10)$$

where l: length (m)

E: Young's modulus (Pa)

I: sectional secondary moment (m⁴)

ρ: specific gravity (kg/m³)

A: sectional area (m²)

The piezoelectric ceramic member 125 is vibrated at a frequency equal to the resonance frequency fs of the vibrator 126 to vibrate the vibrator 126. Therefore, the vibration displacement amount of the vibrator 126 can be increased with a small voltage amount.

With the above arrangement, the vibrator 126 arranged on the optical path of the focusing optical system is vibrated to change the light-receiving direction and area. Upon occurrence of the drop out, when the optical path of the specific light-receiving direction toward the sensor direction is shielded by a piezoelectric vibration actuator, the balance of the brightness portions of the speckle patterns on the sensor is destroyed to cancel the drop out state. Therefore, even if the moving object is moving at a low velocity for a long period of time, drop out can be effectively prevented.

For this purpose, a light-receiving surface 109a of the photodetector 109 must be accurately aligned with the vibrator 126. As can be apparent from FIG. 18B, the light-receiving surface 109a (0.6 mm in diameter) of the photodetector 109 must be accurately aligned with the vibrator (0.3 mm in width). In this embodiment, however, the photodetector 109 and the vibrator 126 are integrally mounted on the circuit board 130, positioning can be facilitated. With the arrangement of the components as shown in FIGS. 18A and 18B, when the optical axis of the focusing optical system shown in FIG. 17B is aligned, the vibrator 126 directly serves as a light-shielding member.

Figure 19A:
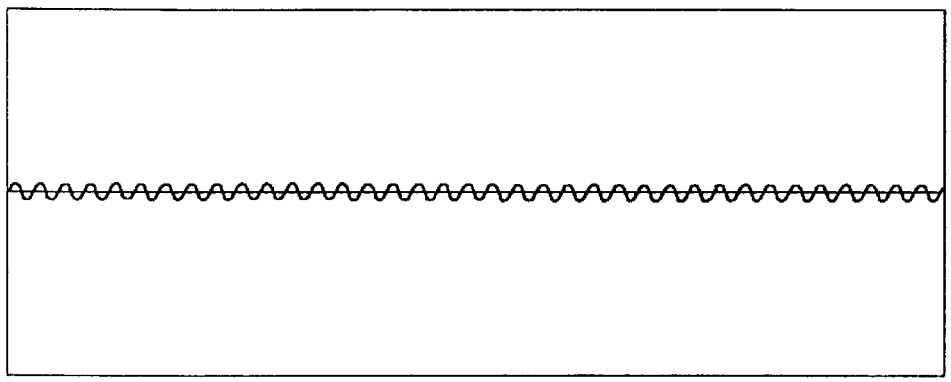
FIGS. 19A and 19B are views for explaining a Doppler signal.
Figure 19B:
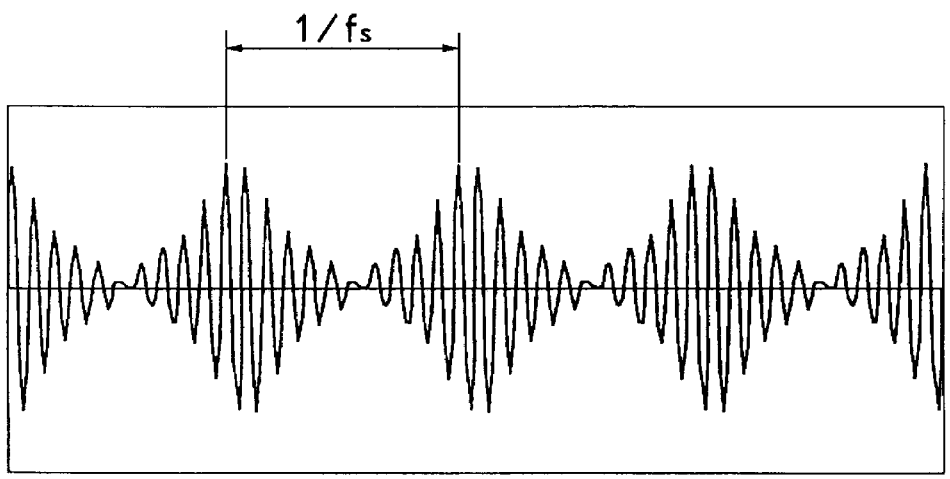

FIGS. 19A and 19B show detection signals from the photodetector 109. FIG. 19A shows a state in which drop out has occurred in a still state, while FIG. 19B shows a state in which the vibrator 126 is driven from the state shown in FIG. 19A. In the signal state shown in FIG. 19A, even if signal processing described with reference to FIG. 17B is performed, a detection error occurs, and no continuous signal is output. In the arrangement of the present invention, as can be apparent from FIG. 19B, the drop out state and the state except for the drop out state are repeated at the period of the resonance frequency fs, thereby preventing the continuous drop out state. In this periodic signal detection state, signal processing described with reference to FIG. 17B is performed to output a continuous signal.

In this embodiment, since the photodetector is integrally arranged with the means for changing the light-receiving area of the photodetector, alignment between the light-shielding member and the light-receiving surface of the photodetector 109 can be facilitated, and a positional shift due to a change over time tends not to occur.

In this embodiment, since the vibrator 126 is driven at a frequency equal to the resonance frequency fs, the vibration displacement amount of the vibrator 126 can be obtained with a small voltage amount, as described above.

Figure 20A:
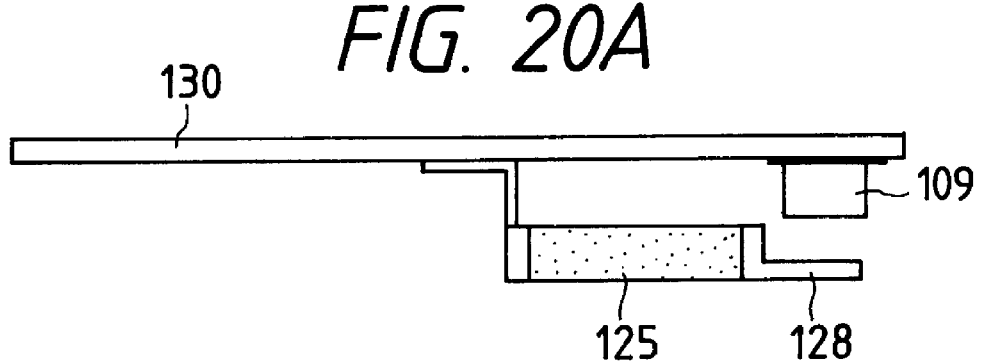
FIGS. 20A and 20B are views showing the arrangement of the circuit board of a laser Doppler velocimeter according to the 11th embodiment of the present invention.
Figure 20B:
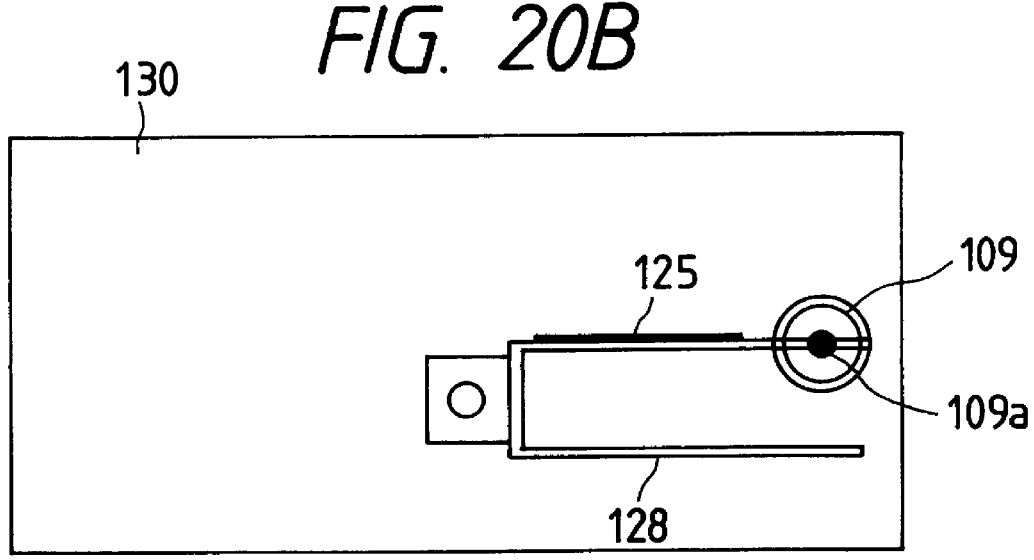

FIGS. 20A and 20B show the arrangement of a circuit board 130 in a laser Doppler velocimeter according to the 11th embodiment of the present invention. The remaining part of this embodiment is substantially the same as that of the 10th embodiment, and a detailed description thereof will be omitted. FIG. 20A is a view of the circuit board 130 when viewed from the side surface in FIG. 17A, and FIG. 20B is a view of the circuit board 130 when viewed from the bottom of FIG. 17A. In the 11th embodiment, a light-shielding member is constituted by a fork vibrator 128, shown in FIG. 20B. A piezoelectric ceramic member 125 is attached to one side of the fork and driven at a frequency equal to a resonance frequency fs of a vibrator 126, thereby vibrating the fork. The fork vibrator 128 is soldered to the circuit board 130 to form an integral body. The right and left vibrator elements of the fork vibrator 128 in FIGS. 20A and 20B vibrate in opposite directions to apply torques to the node in opposite directions. However, the two torques cancel each other at the mounting portion to the circuit board 130. For this reason, no unnecessary vibration modes are generated by the torques near the mounting portion during vibration, thereby obtaining a stabler state.

Figure 21:
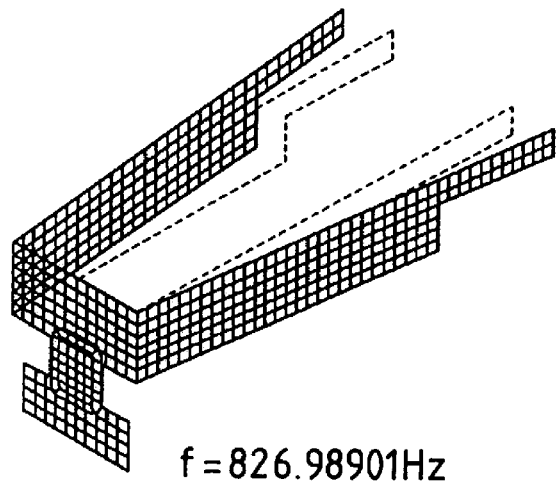
FIG. 21 is a view showing the simulation result of fork vibrator resonance.

FIG. 21 shows the simulation result of a resonance mode of the fork vibrator 128. A dotted portion indicates a position before the vibration. No vibration apparently occurs at the mounting portion to the circuit board 30.

As described above, according to the above embodiment, a detection disable state caused by the drop out can be prevented, and displacement information can always be detected continuously.

In particular, in an apparatus capable of always detecting displacement information continuously, a photodetector and a light-receiving change means are integrally arranged. For this reason, alignment between the photodetector and the light-receiving change means can be facilitated. A positional shift caused by a change over time tends not to occur, and the influence of the drop out can be more accurately prevented.

In the apparatus capable of always detecting displacement information continuously, an optical path shielding member having a light-receiving change means is vibrated at a frequency equal to the resonance frequency thereof, so that the vibration displacement amount of the optical path shielding member can be obtained with a small voltage amount, thereby more effectively preventing the influence of drop out.

Since an optical path shielding means is constituted by a fork vibration member, resonance can be obtained without generating unnecessary vibration modes.

Since scattered light is guided to a photodetector through a lens system, light-receiving efficiency of the scattered light including a signal can be improved, and the S/N ratio can be increased.

Since a photodetector and a light-receiving change means are located outside the plane constituted by the optical paths of the two beams, the apparatus itself can be made compact.

Figure 22:
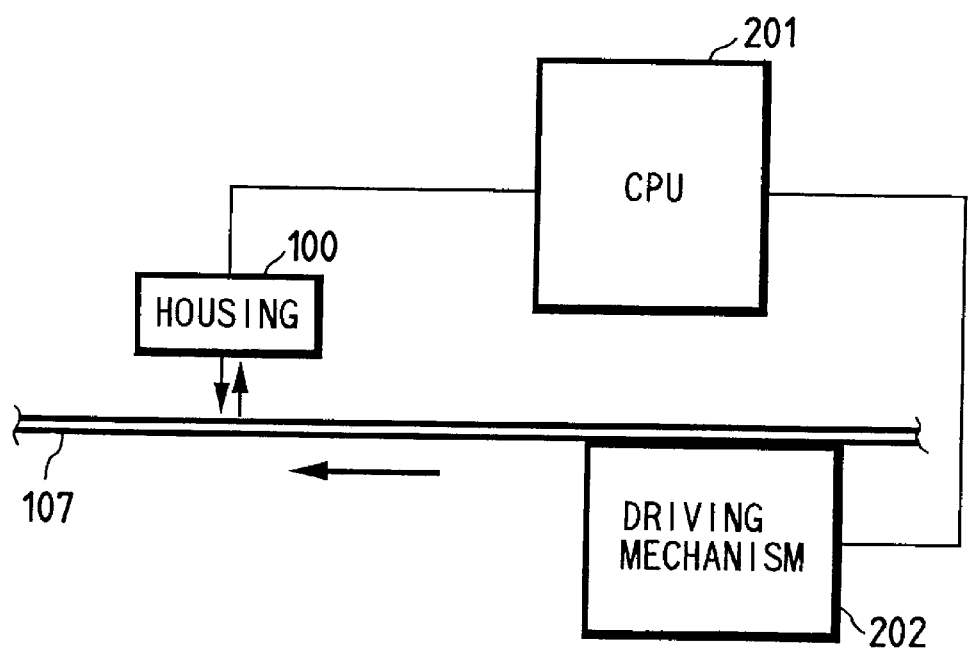
FIG. 22 is a schematic view showing a velocity control system according to the 12th embodiment of the present invention.

FIG. 22 is a schematic view showing the arrangement of the 12th embodiment of the present invention. This embodiment is obtained by applying the laser Doppler velocimeter of the 10th embodiment to a velocity control system. An output from a photodetector 109 in a housing 100 is supplied to a CPU 201 including an electrical processor C and an arithmetic means 119. The CPU 201 sends a control signal to a driving mechanism 202 for driving a target object 107 so as to keep, for example, the velocity constant on the basis of the velocity information of the target object 107 from the CPU 201. The arrangement of the housing 100 is not limited to that of the 10th embodiment, but can be that of any of the embodiments described above.

What is claimed is:

1. An apparatus for measuring displacement information of an object to be measured, comprising:
   an illumination system for illuminating an object with two light beams, having the light beams crossed;
   a photodetector for receiving and detecting light from the object upon incidence of the two beams from said illumination system on the object, the displacement information of the object being measured upon obtaining information of a Doppler shift of the light detected by said photodetector; and
   an adjusting member for changing a light-receiving condition on said photodetector in a portion where the light goes from the object to said photodetector.

2. An apparatus according to claim 1, wherein said adjusting member changes at least one of a light-receiving area on the object, a light-receiving direction, and a light-receiving amount of said photodetector.

3. An apparatus according to claim 1, wherein at least a part of said adjusting member is located in an optical path extending from the object to said photodetector.

4. An apparatus according to claim 3, wherein said adjusting member comprises a stop member displaceable in a direction parallel or perpendicular to the optical path.

5. An apparatus according to claim 3, wherein said adjusting member comprises a plurality of openings and a shutter member for individually changing the light-transmitting/shielding states of said plurality of openings.

6. An apparatus according to claim 3, wherein said adjusting member comprises a light-shielding member for shielding part of the optical path so as to be displaceable.

7. An apparatus according to claim 6, further comprising driving means for driving said light-shielding member at a frequency equal to a resonance frequency of said light-shielding member.

8. An apparatus according to claim 3, wherein said adjusting member comprises a fork vibration member.

9. An apparatus according to claim 1, wherein said photodetector and said adjusting member are integrally formed.

10. An apparatus according to claim 1, further comprising a lens system for guiding the light from the object to said photodetector in an optical path extending from the object to said photodetector.

11. An apparatus according to claim 1, wherein said illumination system comprises means for dividing the beam from said light source into the two beams and an optical system for causing the two beams to be incident on the object.

12. An apparatus according to claim 11, wherein said photodetector and said adjusting member are arranged outside a plane constituted by the two beams.

13. An apparatus according to claim 11, wherein said light source comprises a coherent light source, and said optical system causes the two beams to be incident on the object so as to form interference fringes on the object.

14. An apparatus according to claim 1, further comprising a phase-locked loop for forming a periodic signal on the basis of an output signal from said photodetector.

15. An apparatus according to claim 1, wherein said illumination system comprises an electro-optical crystal member.

16. A system for controlling a displacement of an object, comprising:
   a driving system for driving the object;
   an illumination system for illuminating the object with two light beams, having the light beams crossed;
   a photodetector for receiving and detecting light from the object upon incidence of the two beams from said illumination system on the object;
   a control unit for controlling to drive said driving system based on obtaining information of a Doppler shift of light detected by said photodetector; and
   an adjusting member for changing a light-receiving condition on said photodetector in a portion where the light goes from the object to the photodetector.

17. A system according to claim 16, wherein displacement information of the object is measured upon detection of the light by said photodetector.

* * * * *

UNITED STATES PATENT AND TRADEMARK OFFICE
CERTIFICATE OF CORRECTION

PATENT NO. : 5,815,267
DATED : September 29, 1998
INVENTOR(S) : Kato et al.

It is certified that error appears in the above-indentified patent and that said Letters Patent is hereby corrected as shown below:

COLUMN 1:

Line 35, "and are 6b and" should read --and 6b and are--.

COLUMN 8:

Line 27, "member" should read --members--.

Signed and Sealed this

Twenty-seventh Day of April, 1999

Attest:

Q. TODD DICKINSON

Attesting Officer     Acting Commissioner of Patents and Trademarks